United States Patent
Sumiyoshi et al.

(10) Patent No.: US 8,786,992 B2
(45) Date of Patent: Jul. 22, 2014

(54) ELECTRICAL APPARATUS WITH HIGHER DURABILITY AGAINST SURGES

(75) Inventors: Yoko Sumiyoshi, Anjo (JP); Junichi Fujiwara, Nishio (JP); Yosuke Watanabe, Takahama (JP)

(73) Assignee: Denso Wave Incorporated, Aichi-pref. (JP)

( * ) Notice: Subject to any disclaimer, the term of this patent is extended or adjusted under 35 U.S.C. 154(b) by 627 days.

(21) Appl. No.: 12/727,559

(22) Filed: Mar. 19, 2010

(65) Prior Publication Data
US 2011/0058286 A1   Mar. 10, 2011

(30) Foreign Application Priority Data
Sep. 9, 2009  (JP) ................. 2009-208143

(51) Int. Cl.
*H01T 4/08* (2006.01)
*H01T 4/06* (2006.01)
*H01T 4/10* (2006.01)
*H01T 4/16* (2006.01)
*H01H 9/06* (2006.01)

(52) U.S. Cl.
USPC ........... 361/111; 361/119; 361/112; 361/129; 361/130

(58) Field of Classification Search
CPC ............... H01T 4/08; H01T 4/06; H01T 4/10; H01T 4/16; H02H 9/06
USPC .......................... 361/111, 119, 112, 129, 130
See application file for complete search history.

(56) References Cited

U.S. PATENT DOCUMENTS

| | | | | |
|---|---|---|---|---|
| 4,268,774 A | * | 5/1981 | Forkum, Jr. ................... | 313/141 |
| 4,891,730 A | * | 1/1990 | Saddow et al. ............... | 361/111 |
| 4,912,589 A | * | 3/1990 | Stolarczyk ..................... | 361/56 |
| 5,955,827 A | * | 9/1999 | Short ............................. | 313/141 |
| 6,084,759 A | * | 7/2000 | Hansson et al. .............. | 361/111 |
| 6,108,215 A | | 8/2000 | Kates et al. | |
| 6,266,223 B1 | * | 7/2001 | Curry ............................ | 361/119 |
| 6,970,557 B2 | * | 11/2005 | Rodriguez .................... | 379/403 |

FOREIGN PATENT DOCUMENTS

| | | |
|---|---|---|
| JP | B2-7-107545 | 11/1995 |
| JP | A-10-154459 | 6/1998 |
| JP | A-2001-267037 | 9/2001 |

* cited by examiner

*Primary Examiner* — Rexford Barnie
*Assistant Examiner* — Zeev V Kitov
(74) *Attorney, Agent, or Firm* — Oliff PLC

(57) ABSTRACT

An electrical apparatus, which is immovable in a facility, comprises plural electric circuits. Each electric circuit has one or more resistance elements and is connected to each input terminal connected a power source. The electric circuits are arranged positionally closely with each other. In each electric circuit, a desired functional circuit is connected in series to the resistance element, and a protection circuit is connected in series to the resistance element and connected in parallel with the functional circuit. A discharge member is provided in each electric circuit and arranged between each input terminal and the functional circuit. The discharge member includes a discharge gap which allows the discharge member to face with the discharge member of an adjacently arranged electric circuit.
The discharge gap discharge deliberately to the adjacently positioned discharge member when a voltage applied to a selected electric circuit exceeds a predetermined voltage value.

19 Claims, 11 Drawing Sheets

22: FUNCTIONAL CIR.
23: PROTECTION CIR.
26: RESISTANCE ELEMENT
40: STEP-POWN CIR.

ELECTRICAL APPARATUS WITH HIGHER DURABILITY AGAINST SURGES

CROSS-REFERENCE TO RELATED APPLICATION

This application is based on and claims the benefit of priority from earlier Japanese Patent Application No. 2009-208143 filed Sep. 9, 2009, the description of which is incorporated herein by reference.

BACKGROUND OF THE INVENTION

1. Technical Field of the Invention

The present invention relates to electrical apparatus, and more particularly, to electrical apparatus, such as robots and PLCs (programmable logic controllers), having higher durability against surges and being fixedly used in a stationary plant.

2. Related Art

Electrical apparatus is required to have durability against instantaneous voltage changes, i.e. surges (a sharp rise in voltage), due to lightning, for example. Therefore, electrical apparatus has been ensured to have durability against overcurrent that accompanies surges by providing a protection circuit in an electric circuit (e.g., refer to JP-A-H01-049983). Such a protection circuit is required to be provided to each of the electric circuits in electrical apparatus. In other words, one electric circuit requires one protection circuit. For this reason, in the case where electrical apparatus has a plurality of input terminals for the supply of current from a power source, i.e. in the case where the electrical apparatus includes a plurality of electric circuits, protection circuits are required to be provided to the electric circuits having the respective input terminals.

Robots or PLCs, for example, are categorized as electrical apparatus for fixed facilities and thus are used by being fixed in a plant. There has been a need, recently, for reducing the size of such electrical apparatus by not only mechanically reducing the size of its case (as well as its thickness), for example, but also reducing the size of the board and the electric circuits accommodated in the case. FIG. 10 is a schematic diagram illustrating a circuit configuration of conventional electrical apparatus. The size reduction of electrical apparatus has been attempted by closely disposing two or more electric circuits, e.g. electric circuits 101 and 102 shown in FIG. 1, in parallel and by improving the density.

In this case, in order to reliably absorb the surge energy in the individual electric circuits 101 and 102, the capacities (resistance) of resistance elements 103 and 104, respectively, are required to be set to a little larger than the capacity levels corresponding to the expected surges. However, as the capacities of the resistance elements 103 and 104 are made larger, the sizes of these elements are needed to be proportionately increased. Therefore, enhancing the durability against surges may problematically necessitate the increase of the size of the resistance elements 103 and 104, and accordingly, the size of the electric circuits 101 and 102, respectively. Further, disposing a plurality of electric circuits, such as the electric circuits 101 and 102, in parallel may induce unexpected irregular discharges between the adjacently located electric circuits 101 and 102 when high voltage is applied with a surge. The irregular discharges may result in causing damage to the electric circuits 101 and 102.

Taking the circuit configuration shown in FIG. 1 as an example, let us assume that discharge has occurred between a terminal 107 of a light emitting diode 106 of a functional circuit 105 in the electric circuit 101 and a terminal 108 in the adjacent electric circuit 102. In this case, overcurrent induced by the surge may pass through the light emitting diode 106 of the functional circuit 105 and may be likely to electrically break the light emitting diode 106. It is also assumed that discharge occurs between a coupler 109 of the electric circuit 101 and a coupler 110 of the electric circuit 102. In this case as well, overcurrent induced by the surge may pass through the light emitting diode 106 of the functional circuit 105 and may likely to electrically break the light emitting diode 106. In addition, if discharge occurs between a coupler 111 of the electric circuit 101 and a coupler 112 of the electric circuit 102, overcurrent induced by the surge may pass through the light emitting diode 106 as well as the couplers 111 and 112 and may be likely to electrically break these elements.

SUMMARY OF THE INVENTION

The present invention has been made in light of the problem set forth above and has as its object to provide electrical apparatus which is able to further reduce the size of the electrical apparatus in the case where the electric circuits in the equipment are closely disposed in parallel for the improvement of the density, and which is able to enhance the durability of the equipment against surges by preventing breakage of the elements configuring the electric circuits.

In order to accomplish the objects, the present invention provides an electrical apparatus which is immovable in a facility, comprising a plurality of input terminals selectively connected a power source, and a plurality of electric circuits each having at least one resistance element, each connected to a corresponding one of the input terminals, and arranged positionally closely with each other. Each electric circuit comprises a desired functional circuit connected in series to the resistance element, a protection circuit connected in series to the resistance element and connected in parallel with the functional circuit, and a discharge member. This discharge member is electrically arranged in a path connecting each of the input terminals and the functional circuit and comprises a discharge gap which allows the discharge member to face the discharge member of an adjacently arranged electric circuit. The discharge gap electrically discharges to the discharge member of the adjacently arranged electric circuit when a voltage applied to any of the electric circuits, which is selectively connected to the power source, exceeds a predetermined voltage value.

In the following description, an electric circuit applied with a surge voltage is referred to as "designated electric circuit" and an electric circuit located adjacent to the designated electric circuit is referred to as an "adjacent electric circuit".

According to a first aspect of the present invention, discharge members of plural electric circuits face with each other via a discharge gap therebetween. Thus, when the voltage applied to any designated electric circuit among a plurality of electric circuits becomes equal to or higher than a predetermined voltage due to a surge caused such as by lightning, discharge members concerned deliberately induce discharge through the discharge gap between the designated electric circuit and an adjacent electric circuit. Specifically, when the voltage applied to the designated electric circuit becomes equal to or higher than a predetermined voltage, discharge controlled as intended by a structural design occurs between the discharge members of the designated electric circuit and the adjacent electric circuit.

Thus, the surge energy to be absorbed by the resistance element of the designated electric circuit is partially shared by the resistance element of the adjacent electric circuit. Specifically, energy Es that flows through the designated electric circuit is approximately expressed by:

$$Es = 1/(\text{number of designated electric circuits} + \text{number of adjacent electric circuits})$$

As a result, the surge energy Es imposed on the resistance element of the designated electric circuit will be ½ or less compared to the energy that would have been absorbed by a single resistance element. For example, when an electric circuit is adjacently disposed parallel to a designated electric circuit, discharge will occur from the discharge member of the designated electric circuit to the discharge member of the adjacent electric circuit via the discharge gap when the voltage of the designated electric circuit has risen due to a surge. Therefore, the surge energy Es to be imposed on the resistance element of the specific circuit is approximately expressed by:

$$Es = 1/(1+1)$$

Thus, compared to the case where the resistance element of the specific circuit alone has to absorb the surge energy, the surge energy imposed will be reduced to ½.

Further, when adjacent electric circuits are disposed in parallel on both sides of a designated electric circuit, discharge will occur from the discharge member of the designated electric circuit to the discharge members of the adjacent electric circuits via the discharge gaps when the voltage of the designated electric circuit has risen due to a surge. Therefore, the surge energy Es to be imposed on the resistance element of the specific circuit is approximately expressed by:

$$Es = 1/(1+2)$$

Thus, compared to the case where the resistance element of the specific circuit alone has to absorb the surge energy, the surge energy imposed will be reduced to ⅓.

Thus, by deliberately inducing discharge to the discharge members of the adjacent electric circuits as intended by the structural design, the surge energy is absorbed not only by the resistance element of the designated electric circuit but also by the resistance elements of the adjacent electric circuits. Accordingly, capacity (resistance) reduction can be realized in the resistance elements connected to the respective electric circuits and in the elements of protection circuits.

Further, such sharing of surge energy with the adjacent electric circuits can eliminate the necessity of providing elements and grounding circuits, which are dedicated to the absorption of surge energy. Thus, in the case where the density is improved by closely disposing electric circuits in parallel, further reduction of the electric equipment can be realized by reducing the size of each resistance element. At the same time, the elements configuring the electric circuits can be prevented from being broken, thereby enhancing the durability against surges.

According to a second aspect of the present invention, each discharge member is disposed between a step-down circuit and a functional circuit. The step-down circuit reduces the voltage inputted from a power supply portion via an input terminal. Therefore, the functional circuit on the other side of the step-down circuit with respect to the input terminal will have poor durability against high voltage.

In this regard, as in the second aspect of the present invention, by providing the discharge member between the step-down circuit and the functional circuit, the surge energy will be absorbed by the resistance element of each electric circuit by way of the protection circuit which is connected in parallel to the functional circuit. Thus, each functional circuit, even when it has poor durability against high voltage, can be prevented from being broken by the overcurrent that accompanies the surge. In this way, durability against surges can be enhanced.

In the case where the discharge members are formed with wiring patterns to facilitate the formation, the wiring patterns will be broken every time discharge occurs between the discharge members. Therefore, the shape of each of the discharge members changes with every occurrence of discharge. The discharge voltage created by the discharge that occurs between opposed discharge members changes according to the shape of the end portion of each discharge member. Resultantly, repetition of discharge between the discharge members will break and change the shape of the end portion of each discharge member, leading to problematic change of discharge voltage.

According to a third aspect of the present invention, each discharge member is provided at a wiring pattern configuring each electric circuit, and has a first end portion and a second end portion. The first end portion faces that of the adjacently located electric circuit. The tip end of the first end portion formed in each wiring pattern is ensured to have an acute angle. On the other hand, the second end portion is disposed so that the distance therefrom to the adjacently located electric circuit is shorter than the distance from the first end portion to the adjacently located electric circuit. The tip end of the second end portion has a flat shape. Specifically, in adjacently located electric circuits, the discharge members are formed as wiring patterns facing each other, with the flat second end portions being most closely facing each other. Meanwhile, more on the base side of each wiring pattern than the second end portion, the first end portion having the acutely angled tip end is electrically connected to the second end portion, and permitted to face the first end portion of the adjacently located wiring pattern.

Thus, in adjacently located wiring patterns of the electric circuits, the respective second end portions are located facing each other, each initially having a flat shape. After the second end portions have been broken by the discharge that has occurred therebetween, the first end portions located on more base side of the respective wiring patterns than the respective second end portions will face each other. Specifically, since a discharge gap is formed between the first and second end portions, breakage of the second end portions will allow the first end portions to newly face with each other. In this case, the distance between the first end portions becomes larger than the distance between the second end portions.

In the third aspect of the present invention, the distance between the first end portions and the distance between the second end portions are designed so that discharges between the first end portions and between the second end portions may occur as intended by the structural design and with a predetermined potential difference. In other words, considering the discharge characteristics between different shapes of the end portions, the distance between the first end portions and the distance between the second end portions are designed so that the discharge between the first end portions and the discharge between the second end portions may occur with the same potential difference.

Thus, in the third aspect of the present invention, the distance between the opposed first end portions each having an acutely angled shape and the distance between the opposed second end portions each having a flat shape are designed so that the potential difference caused by the discharge between the second end portions will be the same as the potential difference caused by the discharge between the first end portions.

In the present specification and in the claims, the term "the same potential difference" does not refer to exactly the same potential difference. The term refers to that the discharge between the first end portions and the discharge between the second end portions are aimed to occur with "the same potential difference" as much as possible. As a matter of course, accordingly, the term encompasses an error to an extent that may be tolerated in protecting the electric circuits.

In the third aspect of the present invention, each of the second end portions has a flat shape and each of the first end portions has an acutely angled shape. Specifically, each of the second end portions having a small in-between distance has a flat shape, while each of the first end portions having a large in-between distance has an acutely angled shape. As a result, discharges will occur, first, between the flat second end portions initially facing each other with a small distance therebetween. Following the breakage of the second end portions due to the discharges, the first end portions each having an acutely angled shape with a slightly larger distance therebetween will face each other for the possible occurrence of discharges therebetween. The acutely angled end portions are more liable to induce discharge than flat end portions.

Specifically, compared to the flat end portions, the acutely angled end portions will encourage the occurrence of discharges with the same potential difference even when the distance therebetween is increased. Thus, the discharge voltages are substantially equally controlled in both of the discharges between the second end portions and the discharges between the first end portions. Thus, even when the shapes of the individual end portions of each discharge member are changed due to the repeatedly occurring discharge, the discharge voltages can be controlled to a constant level.

Further, in the third aspect of the present invention, the first and second end portions are provided on the same plane of a board in which the wiring patterns are formed. Therefore, in the course of printing the wiring patterns on the board, the first and second end portions can be simultaneously formed. Thus, the discharge members can be easily formed without increasing the number of processes.

Additionally, discharge is liable to occur on the surface of the board, i.e. on the surface where the wiring patterns are formed. Accordingly, by providing the first and second end portions on the same plane, discharges are allowed to steadily occur between the first end portions and between the second end portions.

According to a fourth aspect of the present invention, the first and second end portions are formed in different planes of the board in which the wiring patterns are formed. Specifically, a space is defined by the first and second end portions in the thickness-wise direction of the board. Thus, each second end portion is provided forming a three-dimensional structure together with the first end portion with a space being defined therebetween.

Each second end portion is positioned more on the side of the tip end of the wiring pattern than the first end portion. Therefore, when the second end portions in the adjacently located wiring patterns are broken by the initial discharges leaving the broken remnant on the board, steady discharges between the first end portions may be prevented, if the first and second end portions are formed in the same plane. In this regard, even when the second end portions are broken, the three-dimensional structure of each of the second end portions will not leave the remnant on the board, whereby the discharges between the first end portions will not be prevented. Accordingly, discharges can be steadily induced over a long period of time.

Further, discharge is more unlikely to occur between the three-dimensionally structured second end portions than between the first end portions formed in the surface of the board. Thus, in the event the second end portion partially remains being broken, discharge will subsequently occur between the first end portions which are more liable to induce discharge along the surface of the board, owing to the three-dimensionally structured second end portion. Accordingly, discharges can be steadily induced without being prevented by the remnant of each second end portion.

In the fourth aspect of the present invention, each of the second end portions facing the adjacently located electric circuit has a flat shape. Thus, the second end portions facing each other in the adjacently located electric circuits will provide a constant distance therebetween. Therefore, in the event the adjacently located second end portions facing each other are displaced in the longitudinal direction perpendicular to the axis between the adjacently located second end portions, discharge will occur between the second end portions taking advantage of the surface roughness of the second end portions. Thus, steady discharges can be induced.

In the fourth aspect of the present invention as well, the distance between the first end portions and the distance between the second end portions are designed so that the potential difference caused by the discharge between the first end portions will be substantially the same as the potential difference caused by the discharge between the second end portions. Thus, the discharge voltage can be controlled to a constant level.

According to a fifth aspect of the present invention, each second end portion facing the adjacently located electric circuit has an acutely angled shape. The acutely angled shape of each of the second end portions will more encourage the occurrence of discharges than the second end portions having a flat shape. This will allow the adjacently located second end portions to be located being more drawn apart from each other (will allow the distance between the adjacently located second end portions to be increased).

The larger distance between the second end portions can reduce the change in the distance between the tip ends of the second end portions, at which discharge occurs, in the event the second end portions are displaced in the longitudinal direction. Thus, steady discharges can be induced without the necessity of enhancing the positional accuracy of the second end portions.

In the fifth aspect of the present invention as well, the distance between the first end portions and the distance between the second end portions are designed so that the potential difference caused by the discharge between the first end portions will be substantially the same as the potential difference caused by the discharge between the second end portions. Thus, the discharge voltage can be controlled to a constant level.

DETAILED DESCRIPTION OF THE PREFERRED EMBODIMENTS

With reference to the accompanying drawings, hereinafter will be described some embodiments of electrical apparatus of the present invention.

First Embodiment

Referring to FIGS. 2 to 5, hereinafter is described electrical apparatus according to a first embodiment of the present invention.

Figure 1:
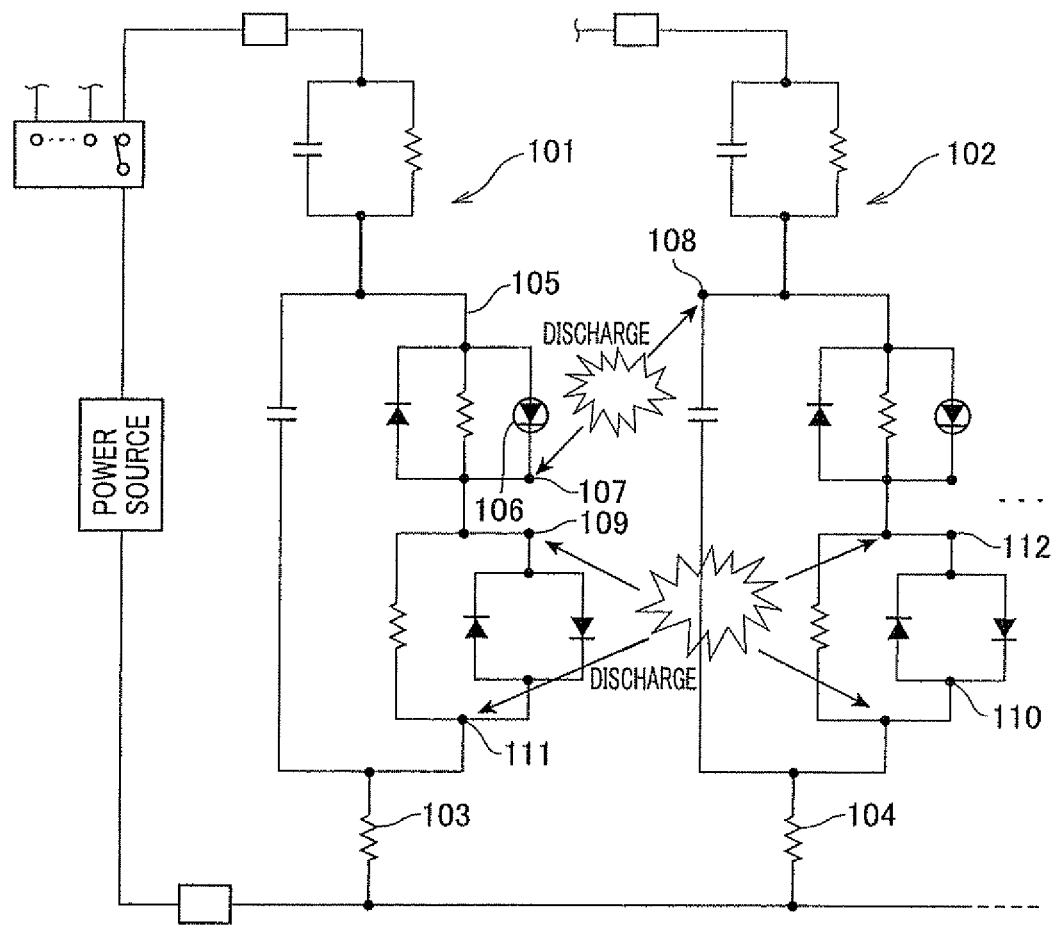
FIG. 1 is a schematic diagram illustrating a circuit configuration of conventional electrical apparatus.
Figure 2:
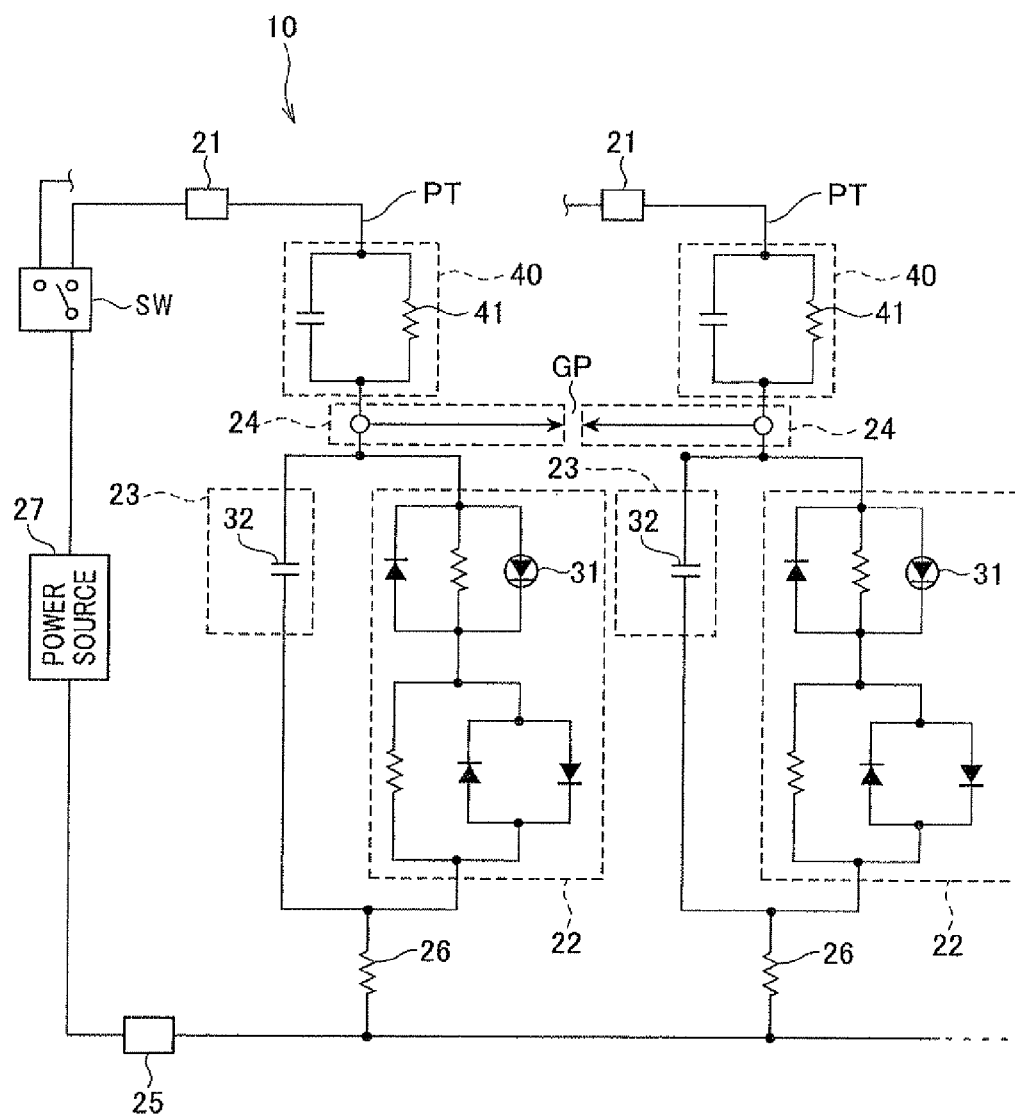
FIG. 2 is a schematic diagram illustrating a circuit configuration of electrical apparatus according to a first embodiment of the present invention.

FIG. 2 is a schematic diagram illustrating a circuit configuration of electrical apparatus 10 according to the first embodiment. The electrical apparatus 10 shown in FIG. 2 is applied to fixed facilities in factories, laboratories and the like. The electrical apparatus 10 corresponds to stationary electrical apparatus applied, for example, to robots, controllers of the robots and PLCs (programmable logic controllers), which are fixed to the fixed facilities. The electrical apparatus 10 is provided with a board, not shown, that includes electric circuits as represented by the circuit configuration shown in FIG. 1. The board is accommodated in a case, though not shown.

The electrical apparatus 10 includes a plurality of electric circuits 20, a power source 27, a switch SW, an input terminal 21, and a connecting terminal 25. Each of the electric circuits 20 includes a functional circuit 22, a protection circuit 23, and a discharge member 24. The plurality of electric circuits 20 are disposed in parallel on a printed circuit board (not shown), at an interval of about several millimeters to several centimeters.

Each electric circuit 20 has an end which is connected to the input terminal 21 through a path PT and the other end which is connected to the connecting terminal 25. Each electric circuit 20 includes at least one resistance element 26 (such as a resistor) as a surge absorbing element. The resistance element 26, when applied with high voltage that accompanies a surge in the electric circuit 20, absorbs the energy of the surge. The resistance element 26 absorbs the energy of the surge by converting the energy into heat, thereby preventing breakage of various elements in the electric circuit 20.

The surge absorbing element is not limited to the resistance element 26. Any element can serve as a surge absorbing element if only the element has a function of absorbing the energy of surges and preventing the elements in the electric circuit 20 from being broken by the surges. For examples, a varistor or a thermistor can take the place of the resistance element 26.

The input terminal 21 and the connecting terminal 25, being located across the functional circuit 22 each other, are connected to a power supply portion, such as the power source 27. One or more of the plurality of input terminals is selectively connected to the power source 27 by a mechanical or electronic switching operation. The input terminal 21, when it is connected to the power source 27, is supplied with current from the power source 27.

In each of the plurality of electric circuits 20, the functional circuit 22 is connected in series to the resistance element 26 that serves as a surge absorbing element. The functional circuit 22 is a circuit including a functional element necessary for each electric circuit 20 and, in the present embodiment, includes a light emitting element 31 as a functional element. A functional element refers to such elements as a light emitting element, i.e. the light emitting element 31 of the present embodiment, or various sensors, which exert a specific function with the supply of current. The functional elements in the individual electric circuits 20 may not be limited to one type but may be of different types.

In each of the plurality of electric circuits 20, the protection circuit 23 is connected in series to the resistance element 26 and connected in parallel to the functional circuit 22. The protection circuit 23 includes a capacitor 32 that serves as a protection element. Upon application of large energy to the electric circuit 20, the protection circuit 23 bypasses the energy to protect the functional circuit 22. Thus, the large energy applied to the electric circuit 20 is allowed to bypass the functional circuit 22 and escape to the connecting terminal 25 by way of the protection circuit 23 and the resistance element 26.

In each of the plurality of electric circuits 20, the discharge member 24 is disposed such that the distance therefrom to the input terminal 21 will be shorter than the distance from the functional circuit 22 to the input terminal 21, and that the discharge member 24 lies in electrically series with the functional circuit 22. Each discharge member 24 is placed to face, via a spatial discharge gap GP, the discharge member 24 of the adjacent electric circuit 20.

When the voltage applied to any one of the plurality of electric circuits 20 becomes equal to or larger than a predetermined voltage, the discharge member 24 of the electric circuit 20 in question with increased voltage induces discharge between the electric circuit 20 in question and the electric circuit 20 adjacent thereto. The discharge member 24 has the following structure as an example, for deliberately inducing discharge with the adjacent electric circuit 20.

The discharge member 24 is designed such that:

(1) between the adjacently located electric circuits 20, the circuit patterns (printed patterns) of the wirings that configure the electric circuits 20 are located close to each other;

(2) between the adjacently located electric circuits 20, terminals (leads), ends, or portions of elements or circuit patterns included in the electric circuits 20 are located close to each other via the discharge gap GP specifically designed; and (3) between the adjacently located electric circuits 20, such terminals (leads), ends, or portions are exposed without being protected by insulators.

By providing each electric circuit 20 with the discharge member 24 designed as in the above example, discharge will be induced from any one of the electric circuits 20 to the adjacent electric circuit 20.

The structural design set forth at the above items (1) to (3) is an example of the discharge member 24. If only discharge can be induced between adjacently located electric circuits 20, the structural design is not limited to the one set forth at the above items (1) to (3).

The electrical apparatus 10 may be provided with a step-down circuit 40 in each of the electric circuits 20. The step-down circuit 40 is disposed such that the distance therefrom to the input terminal 21 will be shorter than the distance from the functional and protection circuits 22 and 23 to the input terminal 21. The step-down circuit 40 is connected in series to the functional and protection circuits 22 and 23. The step-down circuit 40 includes a step-down element, such as a resistance element 41, so that a voltage of over 10 volts or so inputted from the input terminal 21 can be stepped down to a few volts before the voltage is applied to the functional circuit 22. Thus, in the case where each electric circuit 20 includes the step-down circuit 40, the discharge member 24 is disposed in the path PT between the step-down circuit 40 and the functional circuit 22.

Hereinafter is described the performance of the electrical apparatus 10 against surges in the configuration described above.

Figure 3:
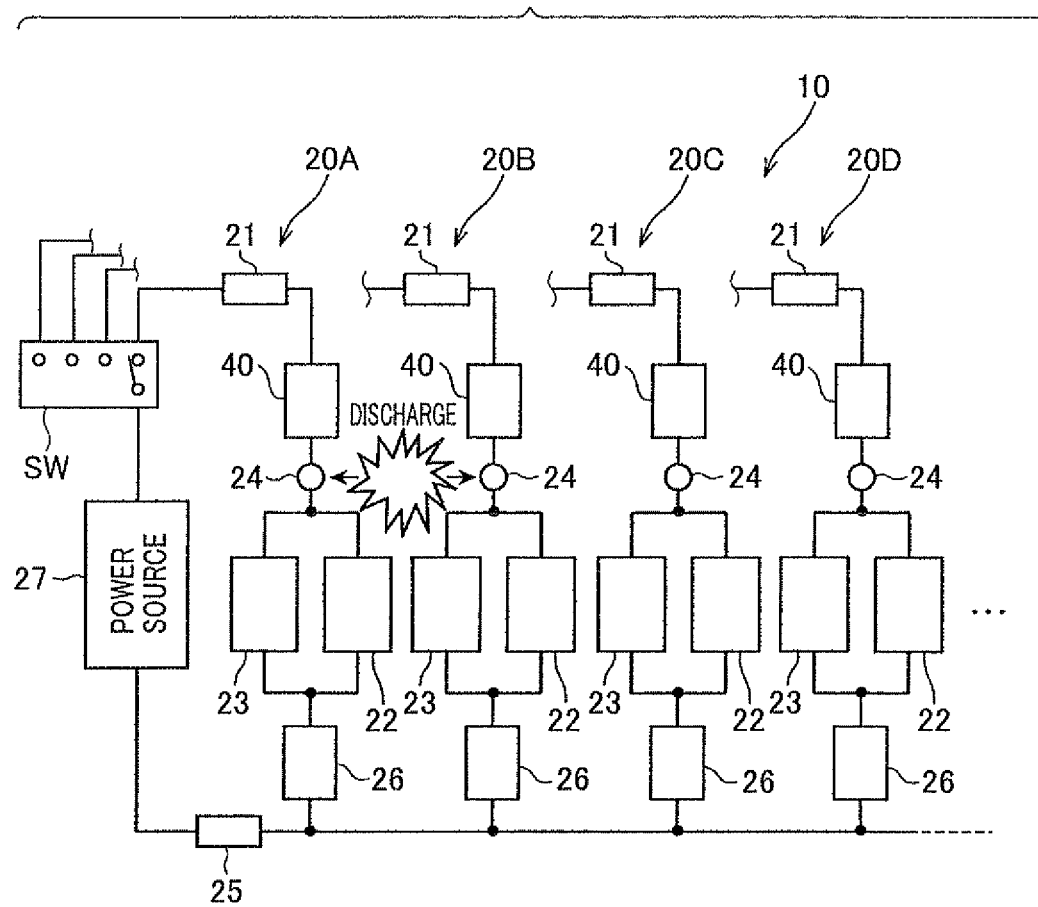
FIG. 3 is a simplified block diagram of the circuit configuration illustrated in FIG. 2.

FIG. 3 is a block diagram illustrating, in a simplified manner, the circuit configuration of the electrical apparatus 10 illustrated in FIG. 2. As shown in FIG. 3, the electrical apparatus 10 includes the plurality of electric circuits 20 connected in parallel. In FIG. 3, the plurality of electric circuits 20 are designated with references 20A to 20D from the left to the right. The following description will be given taking, as an example, a state where, as shown in FIG. 3, the input terminal 21 of the leftmost electric circuit 20A is connected to the power source 27.

When lightning occurs, for example, a surge voltage higher than a normal voltage (over 10 volts to several tens of volts), i.e. a surge voltage of several thousands of volts or more, will be applied to the electrical apparatus 10 from the power source 27. When the input terminal 21 of the electric circuit 20A is connected to the power source 27, the surge voltage applied from the power source 27 to the electrical apparatus 10 is inputted to the electric circuit 20A. Such an electric circuit 20A of FIG. 3 is referred to as a "designated electric circuit". The electric circuit 20B adjacent to the electric circuit 20A, i.e. the designated electric circuit, is referred to as an "adjacent electric circuit".

With the application of a surge voltage to the electric circuit 20A that is the designated electric circuit, discharge will occur in the discharge member 24 of the electric circuit 20A toward the electric circuit 20B that is the adjacent electric circuit. Specifically, since discharge is induced in the discharge member 24 of the electric circuit 20A, discharge occurs in the discharge gap GP between the discharge member 24 of the electric circuit 20A and the discharge member 24 of the electric circuit 20B, while discharges in other portions of these circuits are constrained.

Thus, owing to the presence of the discharge member 24, the deliberate discharges as intended by the structural design will occur between the electric circuit 20A as the designated electric circuit and the electric circuit 20B as the adjacent electric circuit, when the voltage applied to the electric circuit 20A becomes equal to or more than the predetermined voltage. As a result, the surge in the electric circuit 20A is shared with the electric circuit 20B as the adjacent electric circuit.

Thus, the surge energy to be absorbed by the resistance element 26 of the electric circuit 20A is partially shared by the resistance element 26 of the adjacent electric circuit 20B. Specifically, when generalized, an energy Es that flows through the designated electric circuit to which a surge voltage is applied, will be approximately expressed by:

$$Es = 1/(\text{number of designated electric circuits} + \text{number of adjacent electric circuits})$$

As a result, the surge energy Es imposed on the resistance element 26 of the designated electric circuit will be approximately reduced to ½ or less compared to the energy that would have been absorbed by the resistance element 26 of the designated electric circuit 20A alone.

In the example described above, when the voltage of the electric circuit 20A rises due to a surge, discharge occurs from the discharge member 24 of the electric circuit 20A to the discharge member 24 of the adjacent electric circuit 20B which is disposed on the right side of the electric circuit 20A as viewed in FIG. 3. Therefore, compared to the case where the surge energy is imposed on the resistance element 26 of the electric circuit 20A alone, the surge energy Es to be imposed on the resistance element 26 of the electric circuit 20A in this example will be approximately:

$$Es = 1/(1+1) = \tfrac{1}{2}$$

Thus, the energy to be absorbed by the resistance element 26 of the electric circuit 20A will be reduced to ½ compared to conventional electrical apparatus in which such energy is absorbed by a single resistance element of the designated electric circuit.

Figure 4:
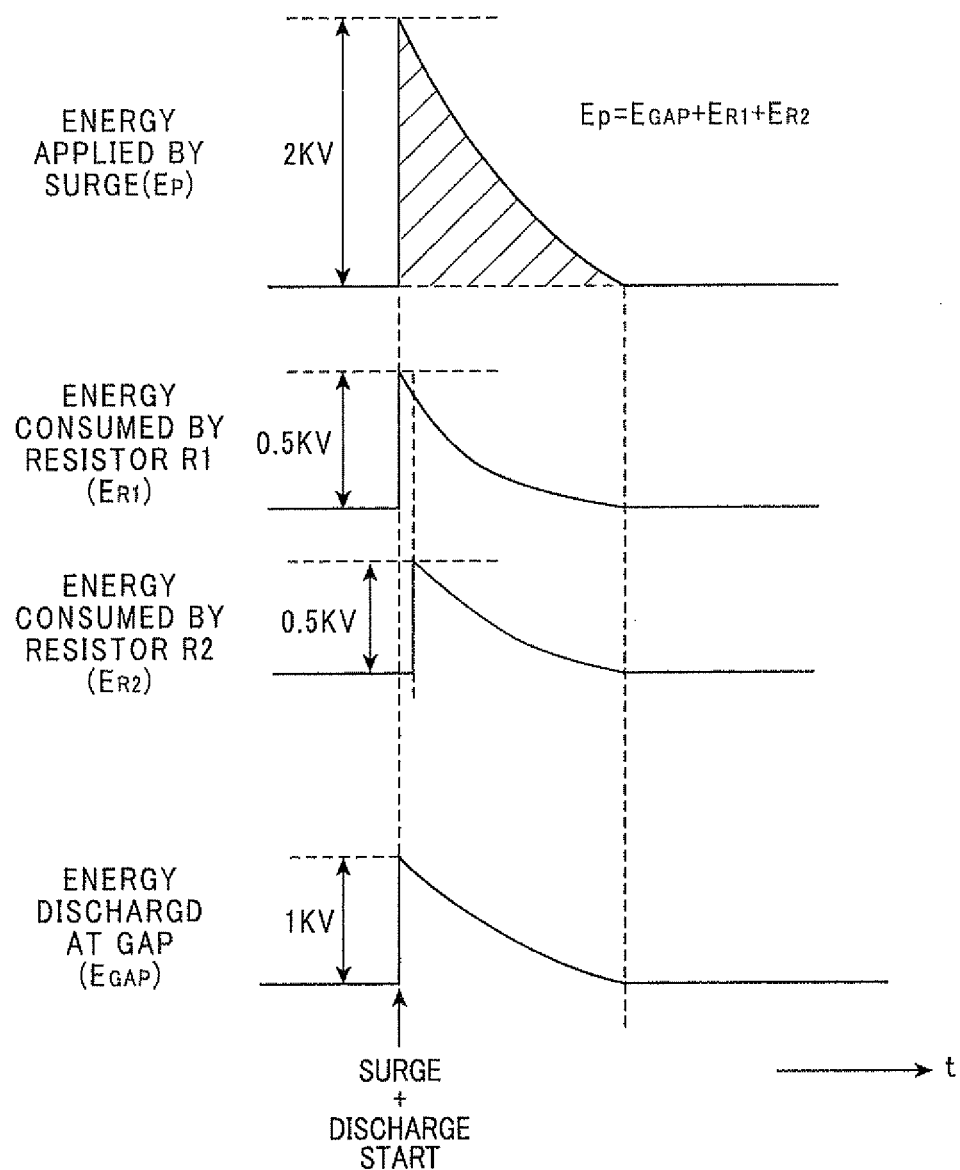
FIG. 4 is a timing chart exemplifying occurrence of a surge and sharing energy applied by the surge.

FIG. 4 shows changes in voltage applied to the two electric circuits 20A and 20B, where a surge is shared by both electric circuits 20A and 20B through the discharge members 24 in the discharge state illustrated in FIG. 3. It is assumed that the two resistance elements 26 have resistance values R1 and R2 which are equal to each other (R1=R2). When a surge occurs at a time instant t1, energy due to the surge (e.g., a voltage 2 kV) is applied to the electric circuit 20A, and immediately after the application of this surge, a discharge occurs between both discharge members 24 of the electric circuits 20A and 20B. This discharge is completed at a time instant t2 immediately after the time instant T1, which is very short. Hence, an amount of energy $E_P$ applied to the electrical equipment 10 by the surge is shared at the time instant t2 (which is almost t1) and gradually consumed as thermal energy. It is assumed that amounts of energy consumed by the resistance elements 26 (R1=R2) (e.g. voltage applied to each resistance element 26 is 0.5 kV) are $E_{R1}$ and $E_{R2}$ and an amount of energy discharged as thermal energy at the discharge gap GP (e.g., voltage applied across the discharge gap GP is 1 kV) is $E_{GAP}$, relationships of $E_{R1} \cong E_{R2}$ and $E_P = E_{GAP} + E_{R1} + E_{R2}$ are realized.

Figure 5:
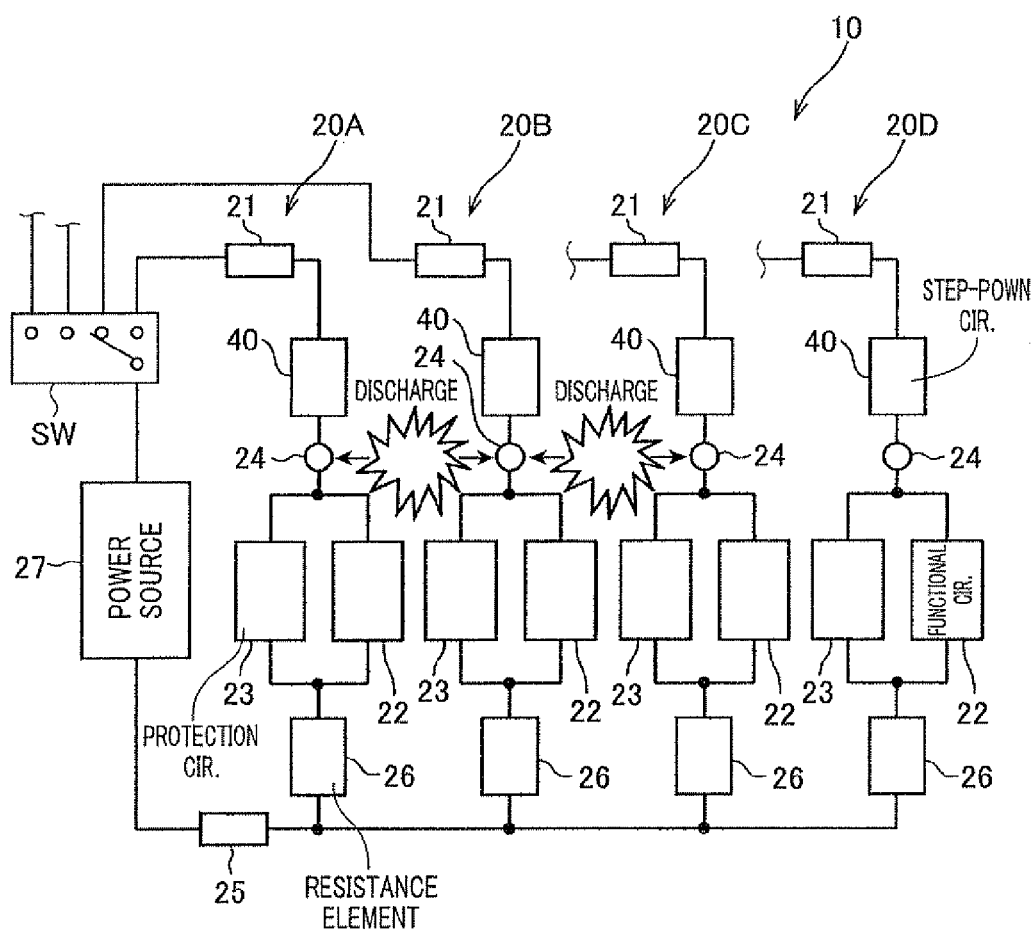
FIG. 5 is another simplified block diagram of the circuit configuration illustrated in FIG. 2.

FIG. 5 is another simplified block diagram of the circuit configuration of the electrical apparatus 10 illustrated in FIG. 2. As shown in FIG. 5, the input terminal 21 of the second electric circuit 20B from the left among the plurality of electric circuits 20 is connected to the power source 27. When a surge voltage is applied in this state from the power source 27 to the electrical apparatus 10, the surge voltage is inputted to the electric circuit 20B. Specifically, in FIG. 5, the electric circuit 20B is the "designated electric circuit". Accordingly, the electric circuits 20A and 20C on both sides of the electric circuit 20B are the "adjacent electric circuits".

Thus, upon application of a surge voltage to the electric circuit 20B as the designated electric circuit, discharge will occur in the discharge member 24 of the electric circuit 20B toward the adjacent electric circuits 20A and 20C via the discharge gaps GP. Specifically, since discharge is induced in the discharge member 24 of the electric circuit 20B, discharges will occur between the discharge member 24 of the electric circuit 20B and the discharge member 24 of the electric circuit 20A, and between the discharge member 24 of the electric circuit 20B and the discharge member 24 of the electric circuit 20C, while discharges are constrained in other parts of these electric circuits.

In the example shown in FIG. 5, when the voltage of the electric circuit 20B rises due to a surge, discharge occurs from the discharge member 24 of the electric circuit 20B toward the discharge members 24 of both of the adjacent electric circuits 20A and 20C. Therefore, the surge energy in the electric circuit 20B is shared by the electric circuits 20A and 20C as the adjacent electric circuits. Thus, the surge energy Ex to be imposed on the resistance element 26 of the electric circuit 20B will be approximately:

$$Es = 1/(1+2) = 1/3$$

As a result, the energy to be absorbed by the resistance element 26 of the electric circuit 20B will be reduced to approximately ⅓ compared to conventional electrical apparatus in which the energy is absorbed by the resistance element of the designated electric circuit alone.

As described above, in adjacently disposed electric circuits 20, discharges will occur between the discharge members 24 of these electric circuits 20 when high voltage is applied due to a surge. In the example of FIG. 3, of the plurality of electric circuits 20 disposed in parallel, the resistance elements 26 of the electric circuit at the left end and the second electric circuit from the left end (electric circuits 20A and 20B in FIG. 3) will be maximally imposed with ½ of the energy that would have been absorbed by the single resistance 26 of the designated electric circuit 20. In the example of FIG. 4, of the plurality of electric circuits 20 disposed in parallel, the resistance elements 26 of the second electric circuit from the left end and the electric circuits on both sides of the second electric circuit from the left end (electric circuits 20A, 20B and 20C in FIG. 4) will be maximally imposed with ⅓ of the energy that would have been absorbed by the single resistance 26 of the designated electric circuit 20.

As a result, of the plurality of electric circuits 20 disposed in parallel in FIG. 3, the resistance elements 26 of the electric circuit 20 at the left end and the second one from the left end can each reduce the capacity to ½. Also, in FIG. 4, the resistance elements 26 of the second electric circuit 20 from the left end and the ones on both sides of the second one from the left end can each reduce the capacity to ⅓.

The size of each resistance element 26 will increase in proportion to the increase of the capacity. Accordingly, by providing the discharge members 24 for inducing discharges, and by sharing the surge energy in the designated electric circuit with the adjacent electric circuits, the capacity as well as the size of each of the resistance elements 26 in the respective electric circuits 20 can be reduced.

According to the first embodiment, in the case where the voltage applied to any one of the plurality of electric circuits 20 becomes equal to or higher than a predetermined voltage due to the surge caused by lightening or the like, discharges are induced between the discharge members 24 of the designated electric circuit 20 with increased voltage and the adjacent electric circuits 20. In other words, when the voltage applied to any one of the electric circuits 20 becomes equal to or higher than a predetermined voltage, discharges as intended by the structural design will occur between the designated electric circuit 20 with increased voltage and the adjacent electric circuits 20.

Therefore, the surge energy to be absorbed by the resistance element 26 of any one of the electric circuits 20 will be partially shared by the resistance elements 26 of the adjacent electric circuits 20. As a result, even when voltage rises in any one of the electric circuits 20, the surge energy Es to be imposed on the resistance element 26 of the designated electric circuit 20 will be reduced to ½ or less compared to the case where the energy has to be absorbed by the resistance element 26 of the designated electric circuit 20 alone.

Thus, allowing discharges to occur between the discharge discharge gaps GP as intended by the structural design, the surge energy is absorbed not only by the resistance element 26 of the designated electric circuit 20 but also by the resistance elements 26 of the adjacent electric circuits 20. Accordingly, capacity (resistance) reduction can be realized in the resistance elements 26 connected to the respective electric circuits 20 and in the protection elements, such as the capacitors 32 in the respective protection circuits 23.

Further, such sharing of surge energy between the adjacent electric circuits 20 can eliminate the necessity of providing elements and grounding circuits, which are dedicated to the absorption of surge energy. Thus, the elements configuring each electric circuit 20 as well as the electric circuit, per se, can be reduced in size. At the same time, enhancement can be achieved in the durability against high voltage and overcurrent that accompanies the surges, while reduction can be achieved in the size of the board and in the size of the entire electrical apparatus.

According to the first embodiment, each discharge member 24 is disposed between the step-down circuit 40 and the functional circuit 22. The step-down circuit 40 reduces the voltage inputted from the power source 27 by way of the input terminal 21. Therefore, the functional circuit 22 on the other side of the step-down circuit 40 with respect to the input terminal 21 will have poor durability against the high voltage.

In this regard, by providing the discharge member 24 between the step-down circuit 40 and the functional circuit 22, the surge energy will be absorbed, in each of the electric circuits 20 concerned, by the resistance elements 26 by way of the protection circuit 23 which is connected in parallel to the functional circuit 22. Thus, each functional circuit 22, even when it has poor durability against high voltage, can be prevented from being broken by the overcurrent that accompanies the surges. In this way, durability against surges can be enhanced.

Second Embodiment

Referring now to FIG. 6 and FIGS. 7A to 7E, hereinafter will be described electrical apparatus according to a second embodiment of the present invention. It should be appreciated that in the second and the subsequent embodiments, the components identical with or similar to those in the first embodiment are given the same reference numerals for the sake of omitting explanation.

Figure 6:
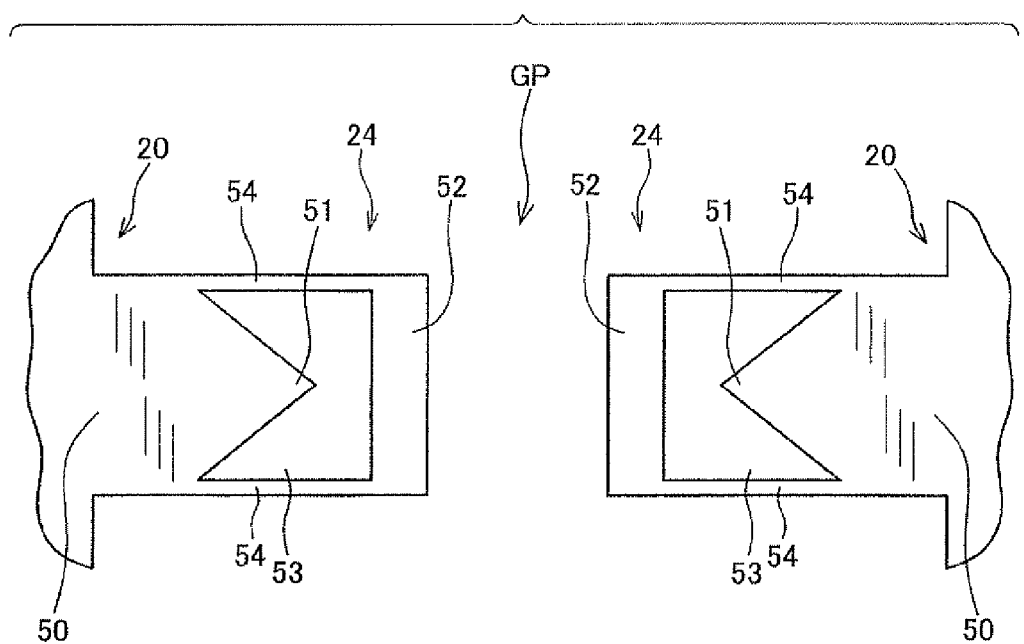
FIG. 6 is a schematic diagram illustrating discharge members of mutually adjacent electrical apparatuses according to a second embodiment of the present invention.

In the second embodiment, the shape of the discharge member 24 is specifically designed. FIG. 6 is a schematic view illustrating the discharge member 24 of the electrical apparatus according to the second embodiment.

As shown in FIG. 6, wiring patterns 50 forming the respective electric circuits 20 are provided. The wiring patterns 50 are formed in the surface of a printed circuit board, not shown, using a printing process. The material used for the wiring patterns is electrically conductive metal, such as copper. In each electric circuit 20, a portion of the wiring pattern 50 is projected to the adjacent electric circuit 20. Thus, each discharge member 24 is formed by the projected portion. Thus, each discharge member 24 is provided at a portion of the wiring pattern 50, which member is connected to the functional circuit 22 and the step-down circuit 40.

Each discharge member 24 has a first end portion 51 and a second end portion 52 formed in the wiring pattern 50. The first end portion 51 of a certain electric circuit 20 faces that of the adjacently located electric circuit 20. The tip end of the first end portion 51 formed in the wiring pattern 50 and facing the adjacently located first end portion 51 is ensured to have an acutely angled shape. Specifically, the tip end of the first end portion 51 of a certain electric circuit 20 faces the tip end of the first end portion 51 of the adjacently located electric circuit 20.

On the other hand, the second end portion 52 of a certain electric circuit 20 is disposed such that the distance therefrom to the adjacent electric circuit 20 is shorter than the distance from the first end portion 51 to the adjacent electric circuit 20. Each second end portion 52 has a gap 53 where no wiring pattern 50 is formed, extending to the first end portion 51. The first and second end portions 51 and 52 are electrically connected by thin connecting pattern portions 54 on both sides. Thus, the first and second end portions 51 and 52 have the same potential.

Specifically, the first end portion 51, the second end portion 52 and the connecting pattern portion 54 are integrally formed in the wiring pattern 50 in a seamless manner. The first and second end portions 51 and 52 are formed in the surface of the board, not shown. Specifically, the first and second end portions 51 and 52 are located on the same plane. The second end portion 52 has an end having a flat shape and facing the adjacently located electric circuit 20. The flat shape is imparted to each second end portion 52, so that the second end portions 52 in two adjacently located electric circuits 20 are substantially parallel to each other.

Figure 7A:
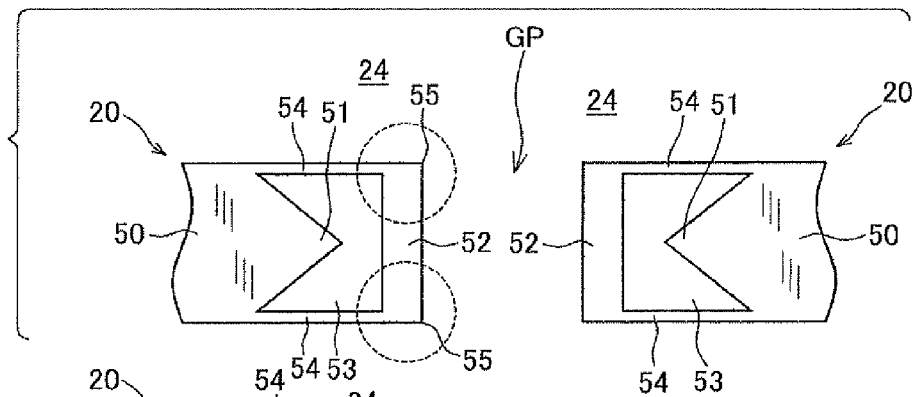
FIGS. 7A to 7E are explanatory views each illustrating changes in the shapes of ends of the discharge members, which are caused by discharges, according to the second embodiment.

Referring to FIGS. 7A to 7E, hereinafter is explained the performance of the discharge members 24 in the configuration described above. For simplification, only FIG. 7A shows two wiring patterns 50 forming the discharge member 24, and in FIGS. 7B to 7E, only one of the wiring patterns 50 is illustrated.

As shown in FIG. 7A, at the initial stage, i.e. at the stage prior to the occurrence of discharge in the discharge members 24, the second end portions 52 are located facing each other in the wiring pattern 50 forming the discharge members 24. Thus, the discharge members 24 are formed by the second end portions 52 each having a flat shape. When surge energy is applied in the state where the second end portions 52 are in face to face in the discharge members 24, discharge will occur, via the discharge gap GP, at the second end portions 52 having a small in-between distance. In this case, the discharge occurs at angular portions which are particularly liable to induce discharge in each second end portion 52. Specifically, as indicated in the broken-line circles in FIG. 7A, discharge occurs between the adjacently located wiring patterns 50 via two corners 55, i.e. the angular portions, of the respective second end portions 52.

Figure 7B:
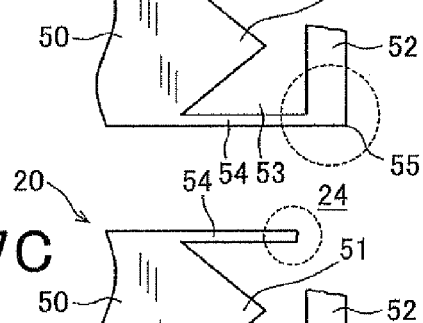

When discharge repeatedly occurs between the corners 55 of the second end portions 52 in the adjacently located wiring patterns 50, each second end portion 52 will be partially eroded or broken, as shown in FIG. 7B, by the impact of the discharges. In this case, the two corners 55 that are liable to induce discharge will not be simultaneously broken but, as shown in FIG. 7B, one of the corners 55 will remain uneroded. Thus, when surge energy is further applied in the state where one of the corners 55 is broken in each of the second end portions 52, discharge will occur between the remnant corners 55 of the adjacently located end portions 52, as shown in the broken-line circle in FIG. 7B, which corners have a small in-between distance.

Figure 7C:
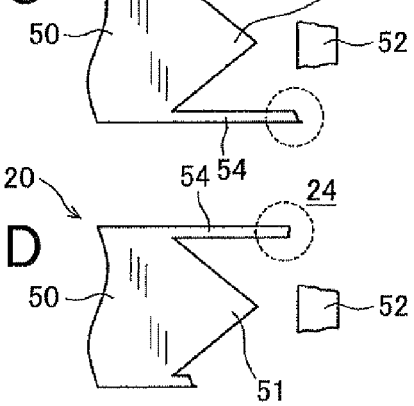

Further, when discharge repeatedly occurs between the remnant corners 55 of the adjacently located second end portions 52, the remnant corners 55 will also be eroded away. As a result, as shown in FIG. 7C, the two connecting pattern portion 54 of each wiring pattern 50 are exposed to the wiring pattern 50 of the adjacently located electric circuit 20. Thus, when surge energy is further applied in this state, discharge will occur between the ends of the opposed connecting pattern portions 54, as shown in the broken-line circle in FIG. 7C, having a small in-between distance. In this case, a portion of each second end portion 52 except the corners 55 that are liable to be broken will remain on the board. However, not being electrically connected to the first end portion 51, the remnant second end portion 52 will not contribute to discharge.

Figure 7D:
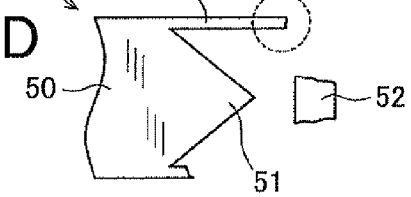

Then, when discharge repeatedly occurs at the connecting pattern portions 54, the connecting pattern portions 54 will also be broken. In this case as well, one of the two connecting pattern portions 54 extending from the respective first end portions 51 to the respective second end portions 52 will be broken in each wiring pattern 50, as shown in FIG. 7D, and the other will remain. Thus, discharge will subsequently occur between the tip ends of the remnant opposed connecting pattern portions 54, as shown in the broken-line circle in FIG. 7O, having a small in-between distance.

Figure 7E:
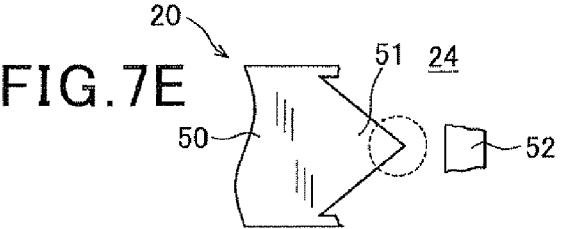

Then, when the remnant connecting pattern portions 54 are finally broken, the first end portion 51 of each wiring pattern 50 is exposed, as shown in FIG. 7E, to the wiring pattern 50 of the adjacently located electric circuit 20. When surge energy is applied further in this state, discharge will occur between the acutely angled first end portions 51 of the adjacently located wiring patterns 50, as shown in the broken-line circle in FIG. 7E.

In the second embodiment, the discharge member 24 has been formed in each wiring pattern 50 that configures each electric circuit 20, being provided with the first and second end portions 51 and 52. Accordingly, while the number of discharges is small, the flat second end portions 52 of the adjacently located electric circuits 20 are most closely located facing each other. Meanwhile, more on the base side of the respective wiring patterns 50 than the second end portions 52 in the adjacently located electric circuits 20, the first end portions 51 having acutely angled tip ends are located facing each other, being electrically connected to the respective second end portions 52.

Thus, the flat second end portions 52 are located facing each other while the number of discharges is small between the wiring patterns 50 of the adjacently located electric circuits 20. Then, when the second end portions 52 are broken by the impact of the discharges therebetween, the first end portions 51 located more on the side of the bases of the respective wiring patterns 50 than the second end portions will be exposed, being permitted to face each other via the discharge gap GP. Specifically, because of the formation of the gap 53 between the second end portion 52 and the first end portion 51 in each of the adjacently located wiring patterns 50, erosion or breakage of the second end portions 52 will permit the first end portions 51 to newly face each other. In this case, the distance between the first end portions 51 will be larger than the distance between the second end portions 52.

While the second end portions 52 each have a flat shape, the first end portions 51 each have an acutely angled shape. Specifically, while the second end portions 52 with a small in-between distance each have a flat shape, the first end portions 51 with a large in-between distance each have an acutely angled shape. As a result, discharges will occur between the second end portions 52 having a flat shape and initially exposed facing each other with a small distance therebetween. Following the breakage of the second end portions 52 due to the discharges, the first end portions 51 each having an acutely angled shape with a slightly larger distance therebetween will be exposed facing each other for the possible occurrence of discharges therebetween. The acutely angled end portions are more liable to induce discharge than flat end portions.

Specifically, compared to the flat end portions, the acutely angled end portions will encourage the occurrence of discharges with the same potential difference even when the distance therebetween is increased. Thus, the discharge voltages are controlled to a substantially equal level in both of the discharge between the second end portions 52 and the discharge between the first end portions 51. Thus, even when the shape of each of the end portions of the discharge member 24 is changed due to the repetition of discharge, the discharge voltages can be controlled to a constant level.

In the second embodiment, the first and second end portions 51 and 52 are provided on the same plane of the board, not shown, in which the wiring patterns 50 are formed. Therefore, in the course of printing the wiring patterns 50 on the board, the first and second end portions 51 and 52 can be simultaneously formed. Thus, the discharge members 24 can be easily formed without increasing the number of processes.

Further, discharge is also liable to occur on the surface of the board, i.e. on the surface where the wiring patterns 50 are formed. Accordingly, by providing the first and second end portions 51 and 52 on the same plane, steady occurrence of discharges can be ensured between the first end portions 51 and between the second end portions 52.

Third Embodiment

Referring now to FIG. 8 and FIGS. 9A to 9D, hereinafter will be described electrical apparatus according to a third embodiment of the present invention.

Figure 8:
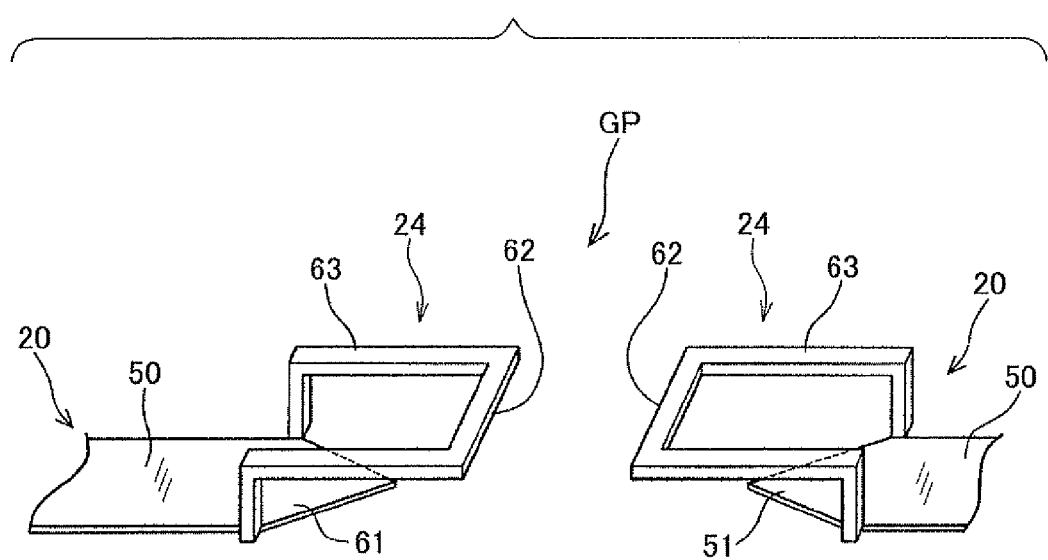
FIG. 8 is a schematic perspective view illustrating discharge members of mutually adjacent electrical apparatuses according to a third embodiment of the present invention.

In the third embodiment, similar to the second embodiment, a specific configuration of the discharge member 24 is designed. FIG. 8 is a schematic perspective view illustrating the discharge members 24 of the electrical apparatus according to the third embodiment. As shown in FIG. 8, the discharge member 24 is provided at the wiring pattern 50 forming each electric circuit 20. The configuration of each wiring pattern 50 is substantially the same as that in the second embodiment.

Each discharge member 24 includes a first end portion 61 formed in the wiring pattern 50, and an electrically conductive member 63 forming a second end portion 62 as a body separate from the wiring pattern 50. The first end portion 61 of a certain electric circuit 20 faces the first end portion 61 of the adjacent electric circuit 20. The end of the wiring pattern 50 forming the first end portion 61 has an acutely angled shape. Specifically, the ends of the first end portions 61 of two adjacently located electric circuits 20 are arranged facing each other.

Meanwhile, the second end portion 62 formed in the conductive member 63 in a certain electric circuit 20 is permitted to locate more on the side of the adjacently located electric circuit 20 than the first end portion 61. A space is defined by the second end portion 62 and the surface of the board, not shown, in which the first end portion 61 is formed. Specifically, in the thickness-wise direction of the board, each second end portion 62 is provided in a plane different from the plane in which the surface of the board formed with the first end portion 61 resides. The conductive member 63 is integrally formed with the second end portion 62 and electrically connected to the first end portion 61. Therefore, the first and second end portions 61 and 62 have the same potential.

The end of the second end portion 62 facing the adjacently located electric circuit 20 has a flat shape. Thus, the second end portions 62 of two adjacently located electric circuits 20 are substantially parallel to each other. Since the second end portions 62 are parallel to each other, the distance between the second end portions 62 is constant in the longitudinal direction perpendicular to an imaginary line connecting the second end portions 62.

Referring to FIGS. 9A to 9D, hereinafter is explained the performance of each discharge member 24 configured as described above. FIGS. 9A to 9D are explanatory views each illustrating change in the shape of each of the end portions of the discharge members 24 caused by discharge, according to the present embodiment.

Figure 9A:
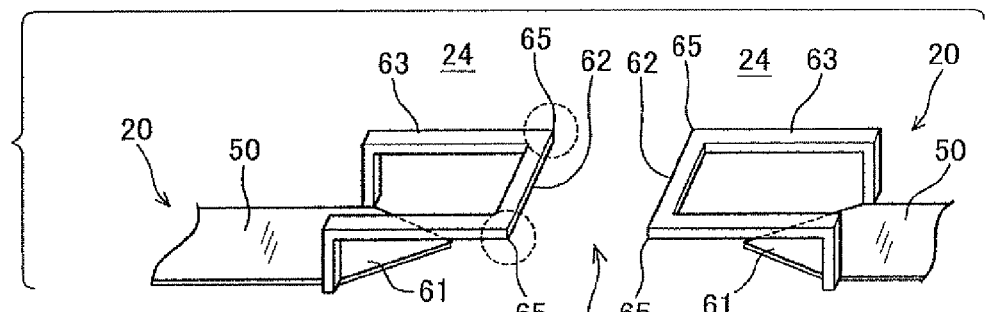
FIGS. 9A to 9D are explanatory views each illustrating changes in the shapes of ends of the discharge members, which are caused by discharges, according to the third embodiment.

As shown in FIG. 9A, in each discharge member 24, the second end portions 62 of the adjacently located wiring patterns 50 are located facing each other at the initial stage, i.e. at the stage prior to the occurrence of discharge. Thus, the discharge member 24 is formed by the second end portions 62 each having an end face of a flat shape. Upon application of surge energy while the second end portions 62 are located facing each other via the discharge gap GP, discharge will occur between the second end portions 62 having a small in-between distance. In this case, discharge will occur at angular portions in the second end portions 62, which portions are particularly liable to induce discharge, i.e. at two corners 65 or the angular portions, in each of the second end portions 62, as indicated by the broken-line circles in FIG. 9A.

Figure 9B:
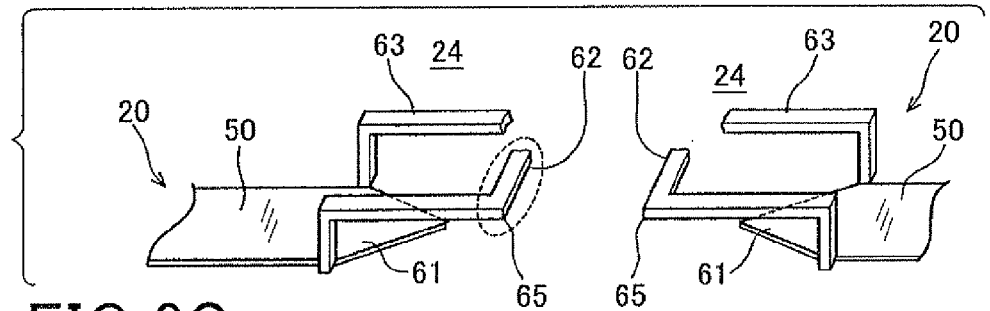

Thus, when discharge repeatedly occurs at the corners 65 in each of the second end portions 62, the conductive member 63 forming each second end portion 62 will be partially broken by the impact of the discharges as shown in FIG. 9B. In this case, the two corners 65 that are liable to induce discharge will not be simultaneously broken, but one of the corners 65 will remain as shown in FIG. 9B. Therefore, when surge energy is applied after the breakage of one of the corners 65 of the second end portion 62, discharge will subsequently occur between the remnant corners 65 of the adjacently located wiring patterns 50, which corners have small in-between distance, as shown in the broken-line circle in FIG. 9B.

Figure 9C:
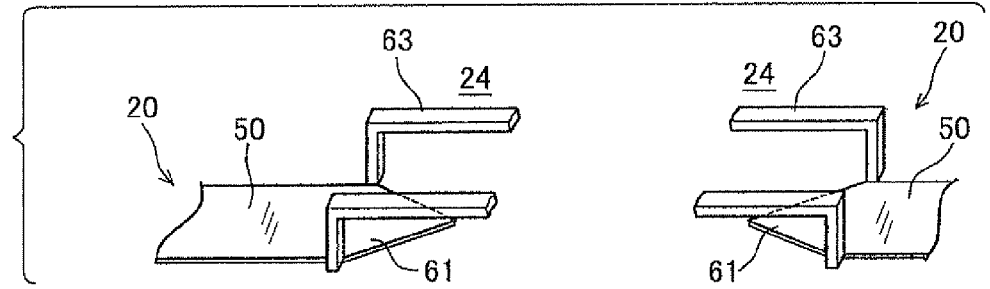

With further repeated occurrence of discharges in the remnant corners 65, the remnant corners 65 will also be broken. As a result, as shown in FIG. 9C, the portion forming the second end portion 62 in the conductive member 63 will disappear. In the third embodiment, as mentioned above, the plane in which the first end portion 61 is formed is different from the plane in which the second end portion 62 is formed. In other words, the first and second end portions 61 and 62 in each wiring pattern 50 are three-dimensionally structured. Accordingly, when the corners 65 are broken in each conductive member 63, the portion forming the second end portion 62 will also disappear. In this case, due to the comparatively large impact of the discharges, the portion forming the second end portion 62 is unlikely to seldom fall to the surface of the board keeping its shape. Therefore, as shown in FIG. 9C, the portion forming the second end 62 disappears from each conductive member 63.

Figure 9D:
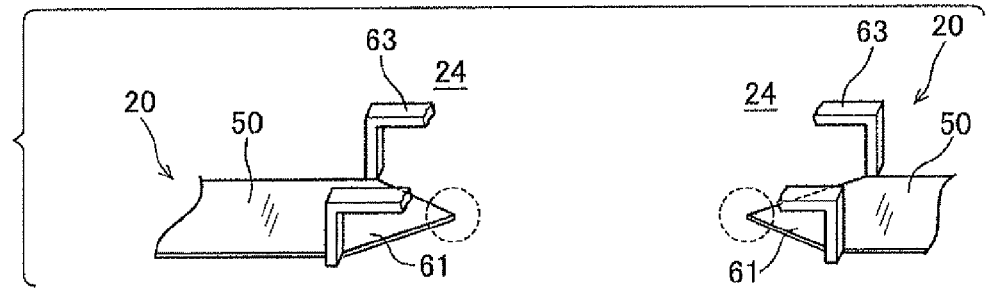

When the second end portion disappears, discharge will subsequently occur between the remnant conductive members 63 of adjacently located wiring patterns 50. In this case as well, the remnant conductive members 63 are broken by the discharges to gradually increase the distance between the conductive members 63. Then, as shown in FIG. 9D, when the distance between the conductive members 63 of the adjacently located wiring patterns 50 becomes larger than a dischargeable distance, discharge no longer occurs between the conductive members 63.

On the other hand, discharge along the surface of the board will occur at a voltage lower than the voltage of spatial discharge. Accordingly, as shown in the broken-line circle in FIG. 9D, upon application of surge energy in the state where the distance between the conductive members 63 has become too large to cause discharge, discharge will occur between the acutely shaped first end portions 61 of the adjacently located wiring patterns 50.

In the third embodiment, the first and second end portions 61 and 62 are formed in different planes of the board, not shown, in which each of the wiring patterns 50 is formed. In other words, a space is defined by the first and second end portions 61 and 62 in the thickness-wise direction of the board. Thus, the second end portion 62 is provided forming a three-dimensional structure together with the first end portion 61 with a space being formed therebetween.

Each second end portion 62 is located more on the side of the tip end of the wiring pattern 50, i.e. more on the side of the opposed electric circuit 20, than the first end portion 61. Accordingly, when the second end portion 62 is broken by the initial discharges, the broken second end portion 62 will disappear without allowing the conductive member 63 to remain on the board. Resultantly, the discharge that would be induced between the first end portions 61 following the breakage of the second end portions 62 will not be prevented. Accordingly, discharges can be steadily induced over a long period of time.

Further, discharge is more unlikely to occur between the three-dimensionally structured second end portions 62 than between the first end portions 61 formed in the surface of the board. Thus, owing to the three-dimensionally structured second end portion 62, in the event the second end portion 62 has partially remained being broken, discharge will subsequently occur between the first end portions 61 which can easily induce discharge along the surface of the board. Accordingly, discharges can be steadily induced to the first end portions 61 without being prevented by the remnant of the second end portion 62.

In the third embodiment, each second end portion 62 facing the adjacently located electric circuit 20 has a flat shape. Thus, the second end portions 62 facing each other in the adjacently located electric circuits 20 will provide a constant distance therebetween in the longitudinal direction. Therefore, in the event the adjacently located second end portions 62 are longitudinally displaced, discharge will occur between any positions of the second end portions 62 taking advantage of the surface roughness of the second end portions 62. Specifically, since the surface roughness provides microscopic corners in each of the second end portions 62, discharge will occur at the microscopic corners as base points. In this way, discharges can be induced in a steady manner.

Fourth Embodiment

Figure 10:
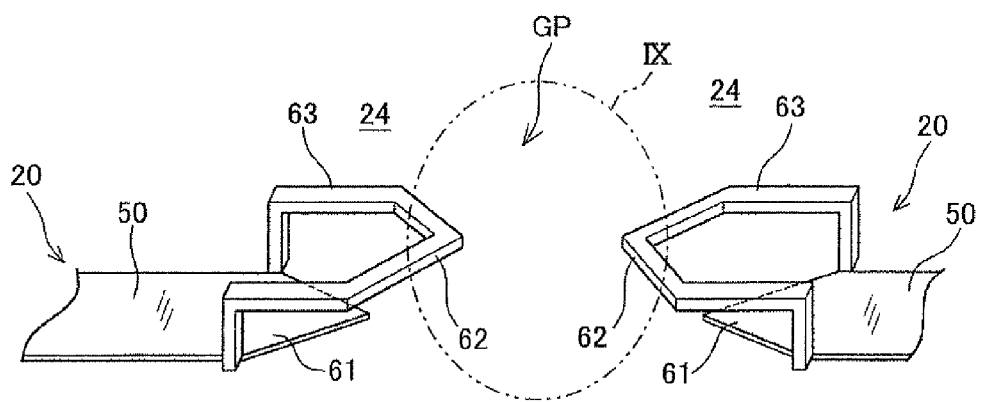
FIG. 10 is a schematic perspective view illustrating discharge members of mutually adjacent electrical apparatuses according to a fourth embodiment of the present invention.
Figure 11A:
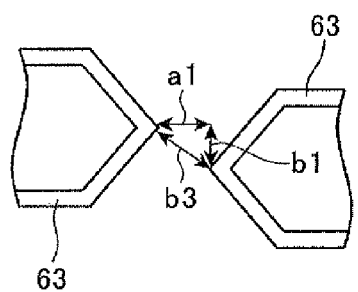
FIGS. 11A and 11B are enlarged plan views of the portion indicated by the dash-dot-dot circle IX of FIG. 10.
Figure 11B:
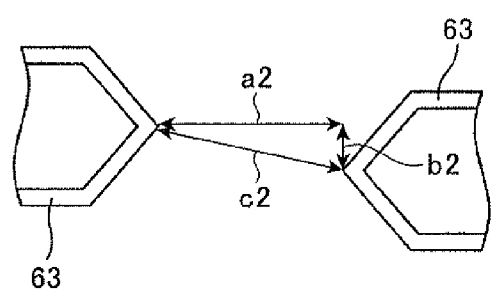

Referring to FIG. 10 and FIGS. 11A and 11B, hereinafter will be described electric equipment according to a fourth embodiment of the present invention. FIG. 10 shows a principal part of the electric equipment of the fourth embodiment. It should be appreciated that the fourth embodiment is a modification of the third embodiment. FIGS. 11A and 11B are enlarged plan views of the portion indicated by the dash-dot-dot circle IX of FIG. 10.

In the fourth embodiment, as shown in FIG. 10, each second end portion 62 formed of the conductive member 63 has an acutely angled shape similar to the first end portion 61. The three-dimensional positional relationship between the first and second end portions 61 and 62 is similar to that of the third embodiment. By forming the acutely angled second end portions 62 in the adjacently located electric circuits 20, the distance therebetween can be made larger than the distance between the flat second end portions 62 of the third embodiment. This is because, as explained in the second embodiment, the acutely angled end portions are more liable to induce discharge than flat end portions. Specifically, compared to the flat end portions, the acutely angled end portions will encourage the occurrence of discharges with the same potential difference even when the distance therebetween is increased.

The conductive member 63 is provided as a body separate from the wiring pattern 50 forming the first end portion 61. Therefore, it is difficult to accurately attach the two conductive members 63 to the board to form the very small discharge members 24. In this regard, the acutely shaped second end portions 62 as in the present embodiment can make large the distance therebetween as mentioned above, facilitating the attachment of the conductive member 63 to the board.

The larger distance between the acutely angled second end portions 62 can reduce the change in the distance between the tip ends of the second end portions 62, in the event the second end portions 62 are displaced in the longitudinal direction. Specifically, as shown in FIG. 11A, when a distance a1 between the tip ends of the second end portions 62 is small, the longitudinal displacement of the tip ends by a distance b1 allows a distance c1 between the tip ends to be larger than the distance a1. Thus, the difference between the distance c1 and the distance a1 is large.

On the other hand, as shown in FIG. 11B, when a distance a2 between the tip ends of the second end portions 62 is large, the longitudinal displacement of the tip ends by a distance b2 allows a distance c2 between the tip ends to be larger than the distance a2. However, in this case, the difference between the distance c2 and the distance a2 is relatively small. In other words, when the distance a2 between the tip ends of the second end portions 62 is large, the distance c2 and the distance a2 will remain almost equal, irrespective of the change in the distance b2. Thus, the acutely angled second end portions 62 can mitigate the influence of the possible longitudinal displacement between the tip ends of the second end portions 62.

As described above, in the fourth embodiment, each second end portion 62 facing the adjacently located electric circuit 20 has an acutely angled shape. Owing to the acutely angled shape, the adjacently located second end portions 62 can be located being more drawn apart (the distance between the second end portions 62 can be increased). The larger distance between the second end portions 62 can reduce the change in the distance between the tip ends of the second end portions 62, at which discharge occurs, in the event the second end portions 62 are displaced in the longitudinal direction. Thus, steady discharges can be induced without the necessity of enhancing the positional accuracy of the second end portions 62.

(Modifications)

The present invention described so far is not limited to the embodiments provided above, but may be applied to various embodiments within the scope not departing from the spirit of the present invention.

For example, alternative to the first end portion 51 having a single acutely shaped portion in the second embodiment, the first end portion 51 having two or more acutely angled portions may be used. The same applies to the fourth embodiment.

Figure 12:
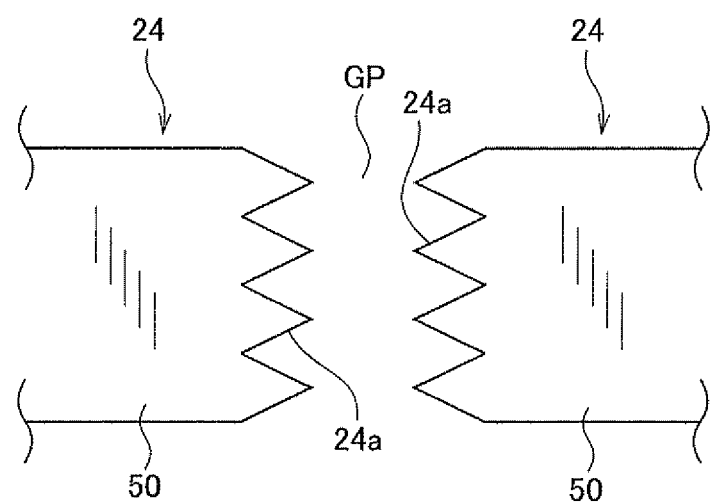
FIGS. 12 and 13 illustrate of modifications of the discharge members which can be adopted in the foregoing embodiments.
Figure 13:
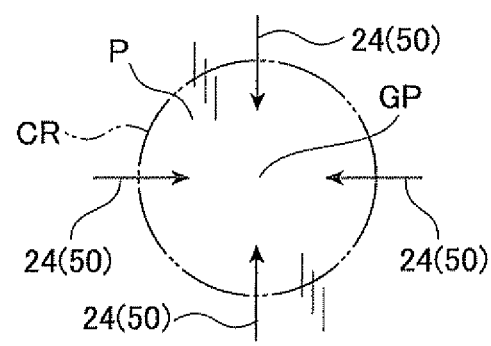

In addition, FIGS. 12 and 13 show alternative examples of the discharge member 24 provided each electric circuit.

In the case shown in FIG. 12, part of the wiring pattern 50 of each electric circuit on a printed circuit board extends toward that of an adjacently arranged electric circuit. The distal end of each extended wiring pattern 50 has a plurality of saw-tooth-shaped edges 24a which also correspond one by one to those of the counter part. Those saw-tooth-shaped edges 24a serves as ends which deliberately or positively promote a discharge between electric circuits when a surge occurs.

On the other hand, FIG. 13 pictorially shows an arrangement of four discharge members 24 of four electric circuits. That is, the plural discharge members 24 can be arranged, for example on a printed circuit board, within a circular area CR at equal intervals in the circumferential direction. This modification intends to show that the arrangement of the discharge members 24 will not be limited to a parallel geometry, but may be arranged in a circular geometry, thus providing with the discharge members 24 with an endlessly adjacent configuration. This also provides the same or similar advantages as the foregoing.

What is claimed is:

1. An electrical apparatus which is placed immovably in a facility, comprising:
   a plurality of input-terminals being selectively electrically connected to a power source, the plurality of input terminals being electrically mutually parallel to the power source; and
   a plurality of electric circuits each having at least one resistance element, the plurality of electric circuits being, one-on-one, electrically connected to the plurality of the input terminals, and being arranged positionally closely with each other on a board,
   wherein each of the electric circuits comprises
      a desired functional circuit being electrically connected in series to the resistance element,
      a protection circuit being electrically connected in series to the resistance element and connected in parallel with the functional circuit, the protection circuit being configured to electrically protect the functional circuit from an excessive voltage applied across the functional circuit, and
      a discharge member being electrically arranged in a path connecting the input terminal and the functional circuit and being arranged to form a discharge gap which faces a discharge member of an adjacently arranged electric circuit included in the plurality of electric circuits, the discharge gap urging an electrical discharge between the discharge members of the mutually adjacently arranged electric circuits connected respectively to corresponding input terminals included in the plurality of input terminals when a voltage applied to the electric circuit selectively electrically connected to the power source exceeds a predetermined voltage value, part of the corresponding input terminals being selectively electrically connected to the power source and a remainder of the corresponding input terminals being electrically disconnected from the power source.

2. The electrical apparatus of claim 1, further comprising a step-down circuit being incorporated in the path in each of the electric circuits and being configured to step down a voltage received through the respective input terminals,
   wherein the discharge member is positioned in the path between the step-down circuit and the functional circuit.

3. The electrical apparatus of claim 1, wherein
   the discharge member is arranged as part of a wiring pattern composing the respective electric circuits, the wiring pattern being formed on the board, the discharge member comprising
      a first end portion which faces the first end portion of the adjacently arranged electric circuit via the discharge gap and has a distal end sharpened toward the discharge member of the adjacently arranged electric circuit, and
      a second end portion which (1) is arranged on the same level as the first end portion on or above the board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions and the discharge members of the mutually adjacently arranged electric circuits, the distance being chosen to cause the discharge when a predetermined potential difference occurs between the first end portions of the discharge members of the mutually adjacently arranged electric circuits.

4. The electrical apparatus of claim 3, wherein the first and second end portions are formed as part of the wiring pattern on the board and the distal end of the second end portion has a straight edge which is parallel with the distal end of the second end portion of the adjacently arranged electric circuit.

5. The electrical apparatus of claim 1, wherein
   the discharge member is arranged as part of a wiring pattern composing the respective electric circuits, the wiring pattern being formed on the board, the discharge member comprising
      a first end portion which faces the first end portion of the adjacently arranged electric circuit via the discharge gap and has a distal end sharpened toward the discharge member of the adjacently arranged electric circuit, and
      a second end portion which (1) is arranged at a different level from the first end portion above the board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

6. The electrical apparatus of claim 5, wherein the first and second end portions are formed as part of the wiring pattern on the board and the distal end of the second end portion has a straight edge which is parallel with the distal end of the second end portion of the adjacently arranged electric circuit.

7. The electrical apparatus of claim 1, wherein
the discharge member is arranged as part of a wiring pattern composing the respective electric circuits, the wiring pattern being formed on the board, and comprises
a first end portion which faces the first end portion of the adjacently arranged electric circuit via the discharge gap and has a distal end sharpened toward the discharge member of the adjacently arranged electric circuit, and
a second end portion which (1) is arranged at a different level from the first end portion above the board, (2) has a sharpened distal end sharpened toward the discharge member of the adjacently arranged electric circuit, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

8. The electrical apparatus of claim 2, wherein
the discharge member is arranged as part of a wiring pattern composing the respective electric circuits, the wiring pattern being formed on the board, the discharge member comprising
a first end portion which faces the first end portion of the adjacently arranged electric circuit via the discharge gap and has a distal end sharpened toward the discharge member of the adjacently arranged electric circuit, and
a second end portion which (1) is arranged on the same level as the first end portion on or above the board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions and the discharge members of the mutually adjacently arranged electric circuits, the distance being chosen to cause the discharge when a predetermined potential difference occurs between the first end portions of the discharge members of the mutually adjacently arranged electric circuits.

9. The electrical apparatus of claim 8, wherein the first and second end portions are formed as part of the wiring pattern on the board and the distal end of the second end portion has a straight edge which is parallel with the distal end of the second end portion of the adjacently arranged electric circuit.

10. The electrical apparatus of claim 2, wherein
the discharge member is arranged as part of a wiring pattern composing the respective electric circuits, the wiring pattern being formed on the board, the discharge member comprising
a first end portion which faces the first end portion of the adjacently arranged electric circuit via the discharge gap and has a distal end sharpened toward the discharge member of the adjacently arranged electric circuit, and
a second end portion which (1) is arranged at a different level from the first end portion above the board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

11. The electrical apparatus of claim 10, wherein the first and second end portions are formed as part of the wiring pattern on the board and the distal end of the second end portion has a straight edge which is parallel with the distal end of the second end portion of the adjacently arranged electric circuit.

12. The electrical apparatus of claim 2, wherein
the discharge member is arranged as part of a wiring pattern composing the respective electric circuits, the wiring pattern being formed on the board, and comprises
a first end portion which faces the first end portion of the adjacently arranged electric circuit via the discharge gap and has a distal end sharpened toward the discharge member of the adjacently arranged electric circuit, and
a second end portion which (1) is arranged at a different level from the first end portion above the board, (2) has a sharpened distal end sharpened toward the discharge member of the adjacently arranged electric circuit, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

13. The electrical apparatus of claim 1, wherein the plurality of electric circuits are arranged on a printed circuit board which serves as the board and are two or more in number, the electric circuit selectively connected the power source is one in number, and the adjacent arranged electric circuit is one or more in number.

14. The electrical apparatus of claim 13, further comprising a step-down circuit incorporated in the path in the respective electric circuits and configured to step down a voltage received through the respective input terminals, wherein the discharge member is positioned in the path between the step-down circuit and the functional circuit.

15. The electrical apparatus of claim 13, wherein the discharge member is arranged as part of a wiring pattern composing the respective electric circuits, the wiring pattern being formed on the printed circuit board, the discharge member comprising
a first end portion of the discharge member which faces a first end portion of the adjacently arranged electric circuit via the discharge gap and has a distal end sharpened toward the discharge member of the adjacently arranged electric circuit, and
a second end portion which (1) is arranged on the same level as the first end portion on or above the printed circuit board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions and the discharge members of the mutually adjacently arranged electric circuits, the distance being chosen to cause the discharge when a predetermined potential difference occurs between the first end portions of the discharge members of the mutually adjacently arranged electric circuits.

16. The electrical apparatus of claim 15, wherein the first and second end portions are formed as part of the wiring pattern on the printed circuit board and the distal end of the second end portion has a straight edge which is parallel with the distal end of the second end portion of the adjacently arranged electric circuit.

17. The electrical apparatus of claim 13, wherein the discharge member is arranged as part of a wiring pattern composing the respective electric circuits, the wiring pattern being formed on the printed circuit board, the discharge member comprising
   a first end portion of the discharge member which faces a first end portion of the adjacently arranged electric circuit via the discharge gap and has a distal end sharpened toward the discharge member of the adjacently arranged electric circuit, and
   a second end portion which (1) is arranged at a different level from the first end portion above the printed circuit board, (2) has a non-sharpened distal end, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

18. The electrical apparatus of claim 17, wherein the first and second end portions are formed as part of the wiring pattern on the printed circuit board and the distal end of the second end portion has a straight edge which is parallel with the distal end of the second end portion of the adjacently arranged electric circuit.

19. The electrical apparatus of claim 13, wherein the discharge member is arranged as part of a wiring pattern composing the respective electric circuits, the wiring pattern being formed on the printed circuit board, the discharge member comprising
   a first end portion of the discharge member which faces a first end portion of the adjacently arranged electric circuit via the discharge gap and has a distal end sharpened toward the discharge member of the adjacently arranged electric circuit, and
   a second end portion which (1) is arranged at a different level from the first end portion above the printed circuit board, (2) has a sharpened distal end sharpened towards the discharge member of the adjacently arranged electric circuit, (3) is positioned closer than the first end portion to the discharge member of the adjacently arranged electric circuit, (4) is still electrically connected to the first end portion with a spatial gap between the first and second end portions, and (5) is positioned to have a distance between the second end portions of the discharge members of the mutually adjacently arranged electric circuits, the distance being chosen to cause the discharge when a predetermined potential difference occurs between the first end portions of the discharge members of the mutually adjacently arranged electric circuits.

* * * * *